United States Patent [19]

Shigeyoshi et al.

[11] 4,014,641
[45] Mar. 29, 1977

[54] APPARATUS FOR CALCINING POWDERED CEMENT MATERIAL

[75] Inventors: Miyamoto Shigeyoshi; Yamashita Kosuke; Fujiwara Kunihisa; Utsumi Tatsuo, 02, all of Hiroshima, Japan

[73] Assignee: Mitsubishi Jukogyo Kabushiki Kaisha, Tokyo, Japan

[22] Filed: Aug. 15, 1975

[21] Appl. No.: 604,910

[30] Foreign Application Priority Data

Sept. 30, 1974 Japan .............................. 49-112550

[52] U.S. Cl. ................................ 432/58; 34/57 E; 432/106
[51] Int. Cl.² ........................................... F27B 15/00
[58] Field of Search ................ 432/14, 15, 58, 106; 34/57 E

[56] References Cited
UNITED STATES PATENTS

| | | |
|---|---|---|
| 3,881,861 | 5/1975 | Ritzmann ............................ 432/14 |
| 3,881,862 | 5/1975 | Nishida et al. ...................... 432/14 |
| 3,904,353 | 9/1975 | Bosshard et al. .................... 432/14 |
| 3,910,754 | 10/1975 | Weber et al. ......................... 432/14 |

Primary Examiner—John J. Camby
Attorney, Agent, or Firm—Toren, McGeady and Stanger

[57] ABSTRACT

Improvements in the apparatus for calcining powdered cement material and removing nitrogen oxides from the entire exhaust gases from the burning equipment. The apparatus comprises making the most of the sensible heat and fluidity of the cement material preheated by the burning equipment and using the material as a catalyst for diffusing and vaporizing the fuel, thereby producing reducing gases, and then bringing the reducing gases into contact with combustion gases from the kiln for stepwise combustion. The invention is also concerned with other improvements in the apparatus for carrying the method into practice.

8 Claims, 12 Drawing Figures

APPARATUS FOR CALCINING POWDERED CEMENT MATERIAL

This invention relates to improvements in the method of calcining powdered cement material and in the apparatus for carrying the method into practice.

For the purpose of the invention, the term "calcination" (decarbonation) of a mixture of powdered cement materials (herein referred to simply as "cement material") is used to mean a process for driving out carbon dioxide from calcium carbonate (in a reaction as represented by the formula $CaCO_3 \rightarrow CaO + CO_2$). The reaction is endothermic. After the calcination, the cement material goes through a burning process which involves an exothermic reaction to form cement clinker.

In the conventional kiln equipped with a suspension preheater, the heat for burning the cement material is provided solely by the combustion of fuel at the terminating zone of the kiln where clinker is discharged. In recent years attempts have been made to install a calciner between the kiln and preheater and decarbonate the material in the calciner with heat from an additional heat source in order to increase the burning capacity per unit volume of the kiln. To attain this end a variety of methods and arrangements have already been proposed. However, all of them have various disadvantages yet as described below.

For example, in withdrawing hot air from the clinker cooler and utilizing the same in the calciner in accordance with the prior art methods, the extracted air is directly admitted to the calciner. Usually, however, the temperature of extracted air varies frequently because the rate of clinker discharge from the kiln to the cooler is not uniform, and these temperature variations can result in clogging of the cyclones constituting the suspension preheater.

In introducing the hot air from the cooler into the calciner, some methods conduct the air by induction and others by forced draft. The former requires a throttling mechanism in the duct and the latter needs a forced draft fan with much power consumption. The throttling mechanism, when employed, is usually installed on the upstream side of a point where the exhaust gases from the kiln join those from the calciner. This facilitates the introduction of the extracted air from the cooler into the calciner while, at the same time, it tends to deposit alkalis on the brick lining wall portion of the suspension preheater beneath the throttling mechanism. The deposit (called "coating" in the parlance of cement industry) will grow with the progress of operation, increasing the draft resistance on the kiln side to such an extent that the draft resistance on the air extraction side has to be adjusted accordingly.

Further, when the system is designed to supply fuel, primary air, secondary air (extracted from the cooler), and cement material altogether to the calcining furnace (cf. Japanese Patent Publication No. 30404/72), localized overheating and consequent material fursion and coating growth often result. To avoid this overheating, another known system controls the combustion rate in the calciner with a short oxygen supply. The latter tends to cause so-called after burning in the cyclones of the suspension preheater that follow the calciner, the phenomenon leading to clogging of the cyclones. Moreover, the temperature of exhaust gases from the suspension preheater will be high with a large caloric loss.

The prior art burning systems have common advantages of high decarbonation rates of cement material and limited production of nitrogen oxides due to relatively low temperatures in the calciners. However, the conventional arrangements are unable to reduce the combined proportion of nitrogen oxides in the exhaust gases from the kiln (usually of the order of 1000 ppm at the discharging end of the kiln).

It is a principal object of the present invention of provide a method and apparatus for calcining cement material, whereby reducing exhaust gases are produced in a calciner and are mixed with exhaust gases from the kiln, and the proportion of nitrogen oxides in the kiln exhaust is decreased by the catalytic action of the cement material in the gaseous mixture.

Another object of the invention is to provide a method of calcining cement material, which fully utilizes the energy of velocity of injected fuel and primary air entering the calciner and the fluidity of preheated cement material in promoting the diffusion and vaporization of fuel, so that the calciner enables a gas producer to function satisfactorily with a minimum of power requirement and produce reducing exhaust gases within a very short period of time, and also to provide a calciner of a relatively simplified construction adapted for practicing the method.

A further object of the invention is to provide a method and apparatus for calcining cement material by allowing the calciner to function as means for thermally decomposing fuel to form reducing gases including CO and $H_2$, combining the exhaust gases from the calciner with those from the kiln, supplying secondary air on the downstream side of the point where the exhausts join together, so that the gaseous mixture is completely burned and reducing reactions of nitrogen oxides (mainly for conversions $NO + CO \rightarrow \frac{1}{2}N_2 + CO_2$, $NO + H_2 \rightarrow \frac{1}{2}N_2 + H_2O$) are carried out to denitrate the exhaust gases from the kiln.

In the present invention the calcining furnace or calciner is intended to serve as a gas producer and may, therefore, be referred to as such. The terms are herein used alternatively.

Other objects and advantages of the invention will become apparent from the following description taken in conjunction with the accompanying drawings, in which.

Figure 1:
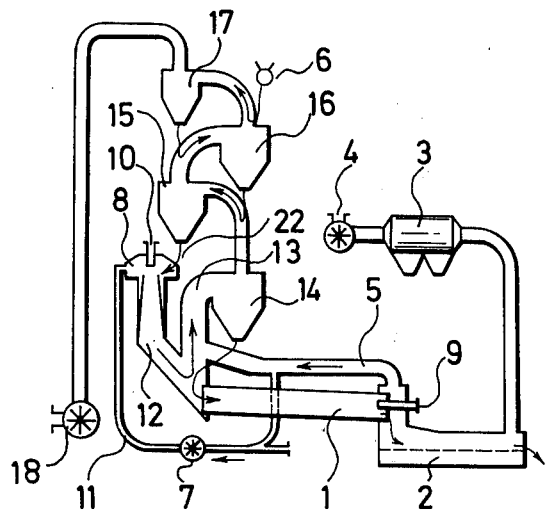
FIG. 1 is a schematic view showing a calcining apparatus of the invention as combined with a kiln and a suspension preheater.
Figure 4:
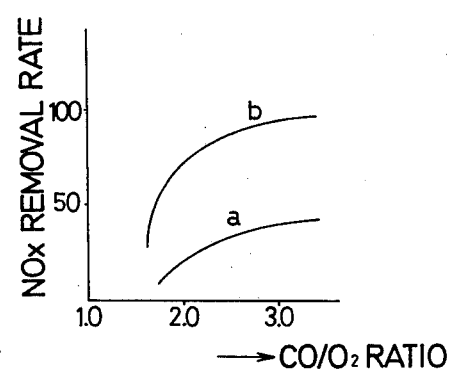
Figure 2:
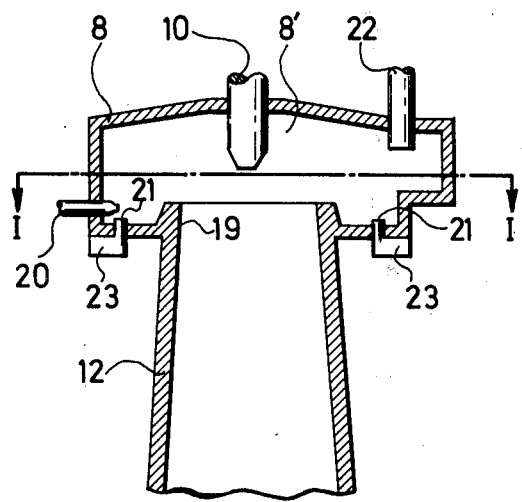
FIG. 2 is a vertical sectional view of calciner according to the invention.
Figure 5:
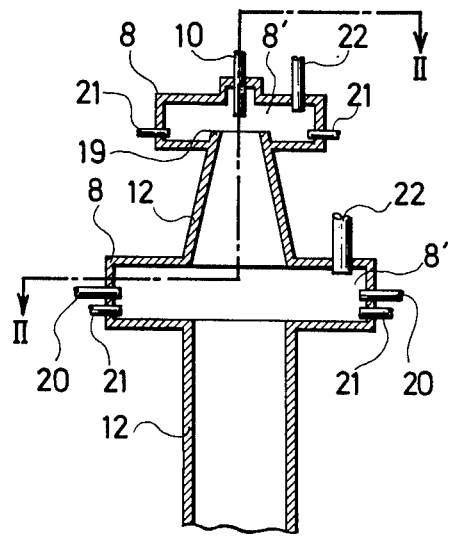
Figure 6:
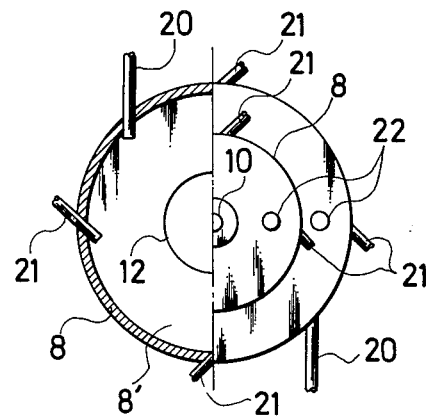
Figure 7:
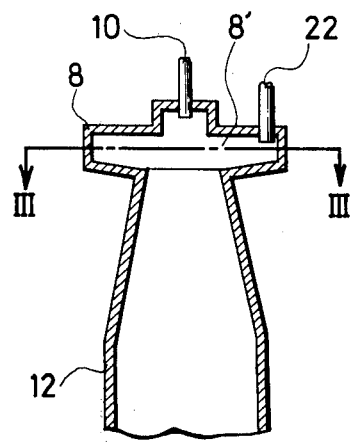
Figure 12:
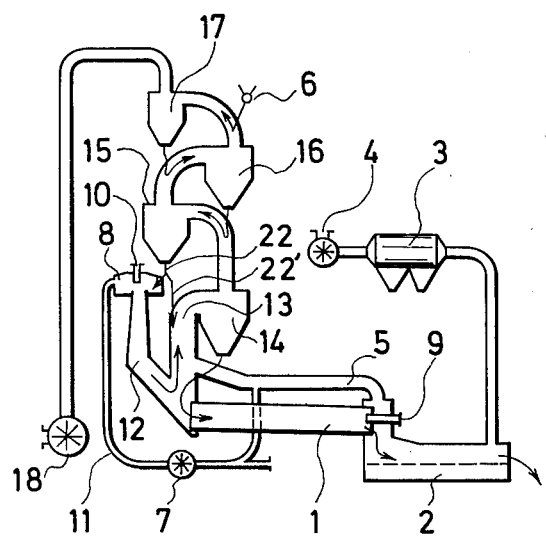
Figure 8:
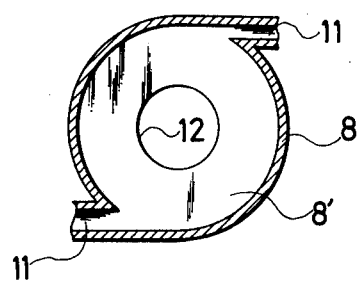
Figure 9:
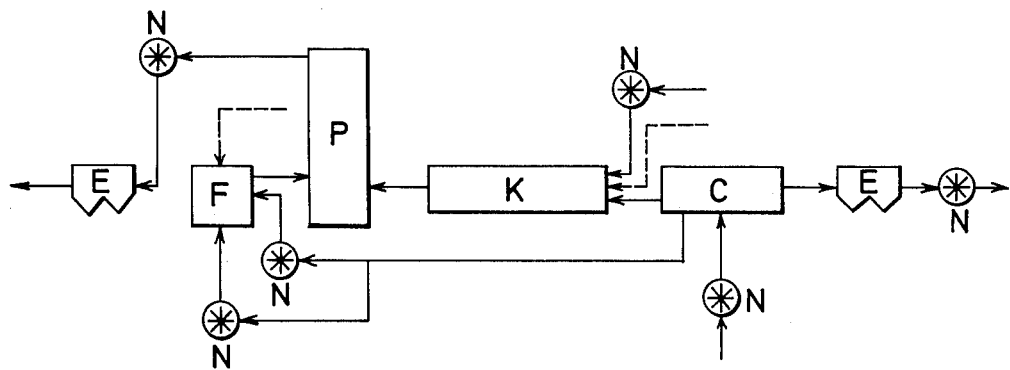
Figure 10:
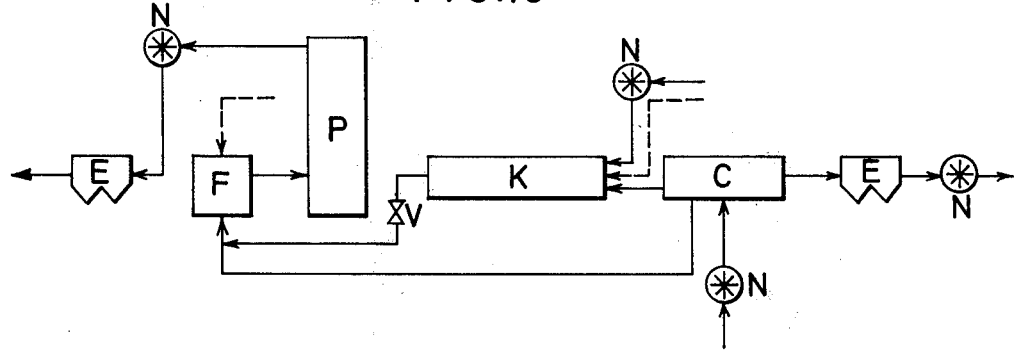
Figure 11:
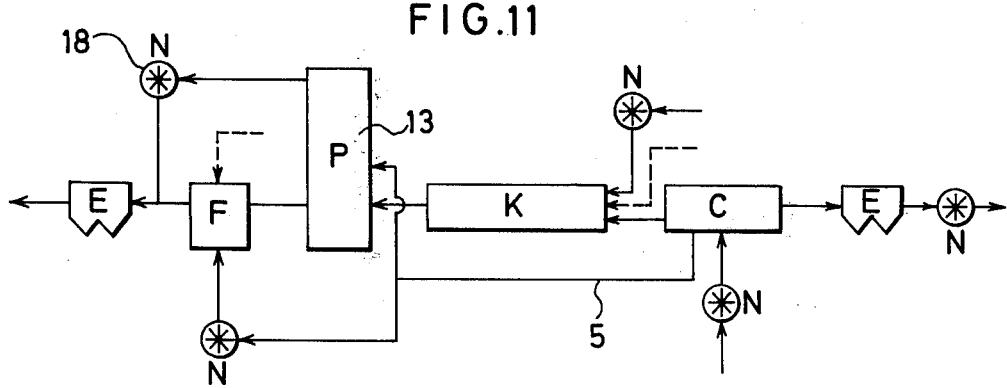

FIG. 4 is a graph illustrating the relationship between the $CO/O_2$ ratio and NOx removal rate achieved with an SV (space velocity) value of 5000 (unit: l/h), 1% $O_2$ (constant), and a reaction temperature of 1000° C, the curve $a$ summarizing the results of the reaction between NOx— and CO-containing gases, and the curve $b$ the results of such a reaction carried out in the presence of the cement material as a catalyst;

FIG. 5 shows a modified form of the calciner illustrated in FIG. 2;

FIG. 6 is a transverse sectional view taken along the line II—II of FIG. 5;

FIG. 7 shows another modified form of the calciner in FIG. 2;

FIG. 8 is a transverse sectional view taken along the line III—III of FIG. 7;

FIGS. 9 and 10 are flowcharts for the burning of cement material in systems using conventional calciners;

FIG. 11 is a flowchart of a system incorporating a calciner according to the invention;

FIG. 12 is a schematic view of a modification of the arrangement shown in FIG. 1.

In FIG. 1 a cement-burning kiln 1 is followed by a clinker cooler 2, which in turn is connected at its rear end with a cooler exhaust eliminator 3 equipped with a cooler exhaust fan 4. The front end of the clinker cooler 2 is connected to an extraction air pipe 5, the other end of which is open in a gas duct 13. 6 is a material feed port for a suspension preheater. A forced draft fan 7 is installed midway an air duct 11 extending from a calciner 8 to the extraction air pipe 5. The kiln 1 is equipped with a burner 9, and the calciner 8 with a burner 10. Fuel for these burners may be either a combustible gas or one that will produce a combustible gas on heating. The calciner 8 has an exhaust duct 12, through which it is communicated at its lower end with a gas duct 13. The front end of the kiln 1 is open in the junction between the exhaust duct 12 and the gas duct 13. Cyclones 14 to 17 constitute the suspension preheater. A fan 18 for drawing out exhaust gases from the kiln is connected to an induction pipe that extends from the uppermost cyclone 17 of the preheater.

Figure 3:
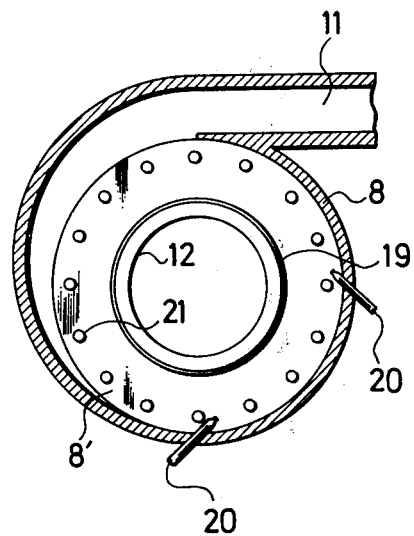
FIG. 3 is a transverse sectional view taken along the line I—I of FIG. 2.

The calciner 8 is of a construction as illustrated in FIGS. 2 and 3. It has a chamber 8' for dispersing the cement material, which may have a polygonal or helical contour although the embodiment shown in FIG. 3 is circular. A weir 19 is formed along the annular joint between the upper end of the exhaust duct 12 and the bottom of the dispersion chamber 8'. According to the requirements, one or more auxiliary burners 20 are provided tangentially through the circumferential wall of the chamber to inject fuel in the direction of swirling air flow to be formed therein. A plurality of air injection nozzles 21, open through the bottom wall of the dispersion chamber 8', are connected to a common air reservoir 23, which communicates with a branch pipe (not shown) from the air duct 11. These air injection nozzles serve to form a movable material layer over the bottom of the chamber. As shown in FIG. 3, the air duct 11 is tangentially connected to the dispersion chamber 8', forming a spiral case. A material chute 22 extends downwardly from the bottom of the cyclone 15 into the chamber.

The operation of the system is as described below. Cement material is introduced through the material feed port 6 into the suspension preheater. In the manner wellknown in the art, the material flows downward while being preheated by upcoming streams of exhaust gases in the cyclones 17, 16, 15 and 14, in the descending order. Part of the preheated cement material is supplied from the cyclone 15 to the material dispersion chamber 8' via the material chute 22.

On the other hand, part of the hot air from the clinker cooler 2 is drawn into the extraction air pipe 5 and thence into the gas duct 13 by means of the induction fan 18. A fraction of the extracted air is led through the air duct 11 into the calciner 8 by the forced draft fan 7. It may or may not contain atmospheric air, and its temperature is within the limits of heat resistance of the fan. The amount of air to be supplied is just enough for the gasification of fuel in the calciner and is less than the theoretical amount required for the combustion, or about 40 – 70% of the theoretical value.

As it enters the dispersion chamber 8', the stream of hot air flows swirlingly therein.

At this time, the cement material preheated to about 600° – 700° C by the suspension preheater is supplied to the swirling air stream in the dispersion chamber 8' via the material chute 22. The material rides the swirl, forming a movable layer, and is centrifugally raised along the circumferential wall of the chamber until it is swirlingly drawn into the exhaust duct 12. Part of the material overflows the weir 19 into the swirling flow in the duct. During this phase, the main burner 10 continues to inject fuel while the auxiliary burners 20 give jets of fuel in the same direction as the swirling air stream. The auxiliary burners use a lower injection pressure than that of the main burner lest their fuel injection should impede the formation of the movable layer. The principal function of these auxiliary burners is to furnished additional heat necessary for the vaporization of fuel and raise the temperature of the material. The temperature of the movable layer is preferably maintained in the neighborhood of 850° C because the cement material is decarbonated when heated to that level.

For improved spraying of the fuel and for an adjustment of the injection angle, the fuel in the main burner 10 may be premixed with about 5% of the theoretical amount of air required for combustion.

The fuel issuing from the main burner 10 disperses into the gases of combustion containing a large amount of hot cement material. As the gases then swirl downwardly through the exhaust duct 12, the fuel partly burns with the oxygen contained in the combustion gases or with the air added to the fuel in the main burner 10, and the rest of the fuel is gasified by the heat received from the combustion gases.

As FIG. 2 shows, the exhaust duct 12 may be expanded downwardly so that the principle of a free turbulence generator applies. The swirling gas flow in such a duct will form two divided streams; one descending along the surrounding wall surface and the other ascending through the center of the duct. Along the boundary between the counter-current layers a violent vortex will develop, promoting the diffusion and mixing of the fuel issued from the main burner 10 and accelerating the fuel gasification.

When the fuel reaches the other end of the exhaust duct 12 or the junction with the gas duct 13, it is in a nearly completely gasified state. The gases at the junction are reducing by nature and contain a large amount of cement material scattered substantially uniformly throughout. The decarbonation reaction is continuously carried out, and the temperature is kept practically in an equilibrium, in the vicinity of 850° C. The temperature being maintained at such a relatively low level, there is no possibility of objectionable coating of the inner wall surfaces or other trouble.

The reducing exhaust gases that have left the exhaust duct 12 then join the hot exhaust gases (at about 1000° C or above) from the kiln, and part of the mixture burns. At this time, principally CO gas contained in the exhaust gases from the calciner reduces the $O_2$ and NO gases in the kiln exhaust. In the process of the reaction, the large amount of cement material contained in the exhaust gases acts as a catalyst to promote the reaction while undergoing its own decarbonation reaction, thereby preventing a temperature increase of the system. As a result, the exhaust gases from the kiln can be denitrated efficiently without any objectionable coating of the wall surfaces or any secondary production of nitrogen oxides.

Next, air for combustion is added from the extraction air pipe 5 to the exhaust gases for the complete combustion of the gases and further promoted decarbonation of the cement material, while inhibiting the evolution of nitrogen oxides.

Following the combustion the gases flow upwardly through the duct 13 into the cyclone 14 in the lowermost stage of the suspension preheater. At this point, the gas temperature is about 850° C and the excess air ratio is within the range of 1.05 – 1.20. Inside the cyclone 14 the charge is separated into the cement material and gases, and then material is conducted to the kiln 1 and the exhaust to the next cyclone 15.

FIG. 4 graphically indicates the catalytic effect of the cement material described above.

A modified form of the second embodiment is illustrated in FIGS. 5 and 6. In this case, air is supplied through air injection nozzles 21 provided on the circumferential wall of the dispersion chamber 8', and the cement material is dispersed in two stages. Other reference numerals used in these figures denote parts corresponding to those in FIGS. 2 and 3. The modified arrangement improves the heat exchange between the powdery cement material and the gases of combustion over that in FIG. 2.

Another modification shown in FIGS. 7 and 8 is of a simpler construction, dispensing with the weir 19 and air injection nozzles 21 of the preceding embodiments. Other reference numerals indicate parts corresponding to those in FIGS. 2 and 3.

FIGS. 9 and 10 are flowcharts for the burning of cement material in conventional systems, and FIG. 11 is a flowchart for the burning process in a system which incorporates a calciner embodying the invention. Throughout these figures, symbol K stands for kiln, C for clinker cooler, E for dust eliminator, P for suspension preheater, and F for calcining furnace. V designates a throttling mechanism and N a fan.

In the system shown in FIG. 9, the hot air from the clinker cooler C is directly admitted to the calcining furnace F. The system of FIG. 10 introduces both the hot air from the cooler and the exhaust gases from the kiln into the furnace. The latter requires a throttling mechanism V.

The calciner according to the present invention achieves the following effects in addition to the decarbonating and denitrating effects above described. In extracting the hot air from the clinker cooler, as shown in FIG. 11, the air is drawn into the gas duct 13 of the suspension preheater through the extraction air pipe 5 by means of the induction fan 18. Therefore, the pressure loss of the hot air system is small regardless of variation in the temperature of air extracted from the cooler, and the extraction of the hot air (at about 700° C) is colorimetrically controlled with ease. Hence, safe operation of the equipment is ensured. Moreover, there is no need of installing a throttling mechanism in the passage for exhaust gases from the kiln, and the temperature in the lower part of the suspension preheater is kept at about 1000° C by the introduction of exhaust gases from the calciner, so that no coating of the wall surfaces will take place. The power consumption of the fan 18 for inducing the exhaust gases from the kiln for hot air supply is small.

Another modification illustrated in FIG. 12 further comprises a material chute 22' for supplying the material from the cyclone 15 directly to the gas duct 13. The additional chute is used to deliver part of the preheated cement material to the gas duct, by passing the calciner 8, and promote the decarbonation in the duct on the downstream side of the open end of the extraction air pipe 5. Except for this addition, the arrangement is identical with that shown in FIG. 1.

What is claimed is:
1. Apparatus for calcining powdered cement material comprising: a kiln having an entrance; a suspension preheater including a plurality of cyclones arranged in vertical juxtaposition with at least a lowermost and a second lowermost cyclone being provided, said cyclones operating to separate cement material from gases when a mixture thereof is introduced therein, said lowermost cyclone having an upper inlet and a lower outlet connected to said kiln to introduce separated cement material thereinto; a gas duct connected at one end to the entrance of said kiln and at its opposite end to said upper inlet of said lowermost cyclone; a gas producer located beneath said second lowermost cyclone and having a bottom opening into said gas duct at a point below where said opposite end of said gas duct is connected to said upper inlet of said lowermost cyclone; means for supplying cement material from said second lowermost cyclone to said gas producer; means for supplying fuel and primary air to said gas producer; and secondary air supplying means located adjacent the point where said bottom of said gas producer opens into said gas duct.

2. Apparatus according to claim 1 wherein said secondary air supplying means is located above the point where said bottom of said gas producer opens into said gas duct.

3. Apparatus according to claim 1, further including means for supplying preheated cement material directly from said second lowermost cyclone into said gas duct.

4. In apparatus for heating powdered cement material, a gas producer comprising: a casing having a surrounding wall, a bottom center portion and a top, with a chamber including a chamber bottom being defined by said surrounding wall within said casing; a plurality of air injection nozzles for blowing primary air from said surrounding wall in said chamber defined therein so as to form a swirling air stream over and along said chamber bottom; a material chute for supplying powdered material into said swirling stream of air being issued from said air injection nozzles; an exhaust duct connected to said bottom center of said casing to draw in said powdered material downwardly in said swirling stream; and a burner for blowing fuel from the top of said casing downwardly toward said exhaust duct, with produced gas being conducted outwardly of said casing together with powdered material through said exhaust duct for further combustion with secondary air.

5. In apparatus for heating powdered cement material, at least one gas producer comprising: a material dispersion chamber having a surrounding wall with a bottom center portion defined therein, and equipped with a plurality of air injection nozzles for blowing primary air into said chamber through said surrounding wall to form therein a swirling air stream; a material chute for supplying powdered material into said swirling stream of air being issued from said air injection nozzles; a swirl-mixing chamber defined in said gas producer below said dispersion chamber with a contour tapering downwardly away from said dispersion chamber to gradually enlarge said swirl-mixing chamber in said downward direction; said gas producer being structured with said dispersion chamber integrally communicated at said bottom center with said swirl-mixing chamber; and a burner located in the highest stage of said dispersion chamber for blowing fuel from the top of said chamber downwardly toward said swirl-mixing chamber; with produced gas being conducted downwardly and outwardly together with powdered material from the lowest stage of said swirl-mixing chamber for further combustion with secondary air.

6. Apparatus according to claim 5, wherein said burner for blowing fuel from the top of said dispersion chamber constitutes a main burner, said apparatus further comprising auxiliary burner means for supplying part of the fuel from the surrounding wall of said chamber to the mixture of oxygen-containing gases and cement material swirling together in the chamber.

7. Apparatus according to claim 5, wherein said material dispersion chamber is formed with a weir along its bottom center opening at which said swirl-mixing chamber opens.

8. Apparatus according to claim 5, wherein two material dispersion chambers are provided in two stages, one above the other.

* * * * *